Figure 1:
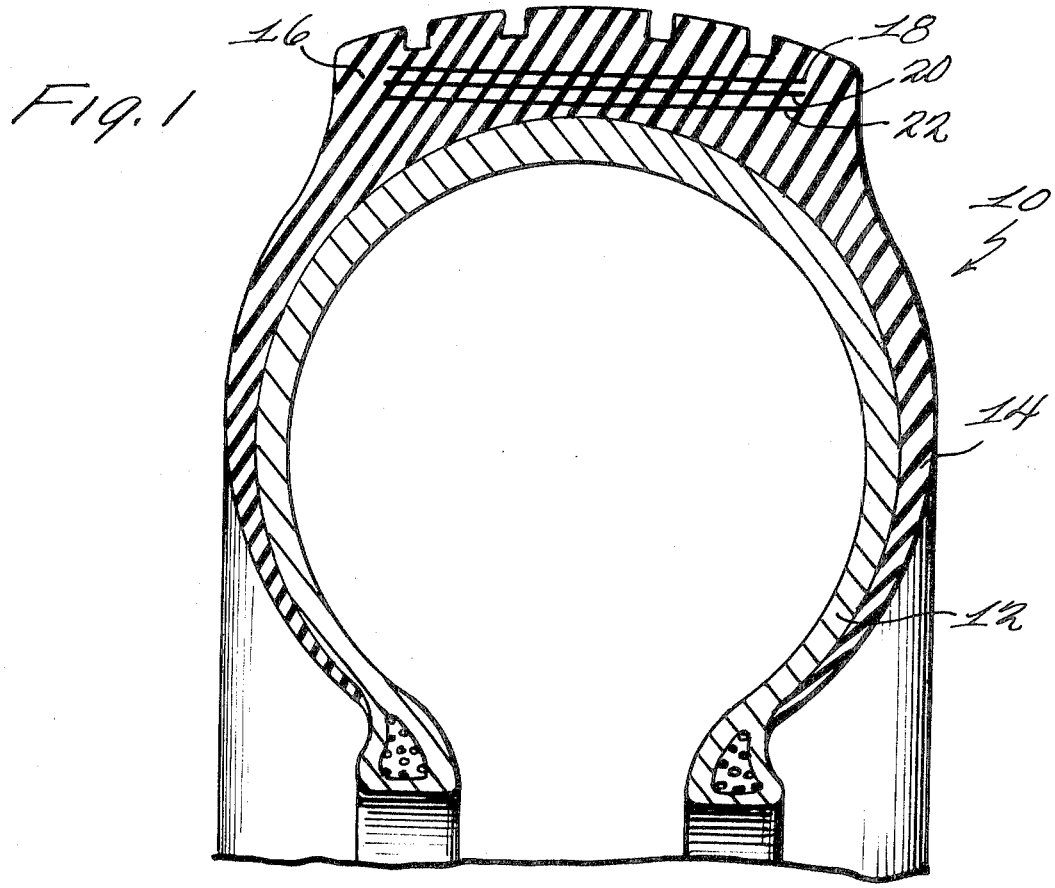

United States Patent
Clapson

[15] 3,637,003
[45] Jan. 25, 1972

[54] COMPOSITE BREAKER BELT FOR RADIAL PLY TIRE

[72] Inventor: Brian Edward Clapson, Cwmbran, England

[73] Assignee: Imperial Chemical Industries Limited, London, England

[22] Filed: Sept. 2, 1966

[21] Appl. No.: 577,023

[30] Foreign Application Priority Data

Sept. 2, 1965    Great Britain......................37,513/65

[52] U.S. Cl............................................152/361, 152/354
[51] Int. Cl.............................................................B60c 9/18
[58] Field of Search..........................152/361, 354, 355, 356

[56] References Cited

UNITED STATES PATENTS

| | | |
|---|---|---|
| 2,990,870 | 7/1961 | Vittorelli......................152/356 |
| 3,233,649 | 2/1966 | Jolivet et al..................152/361 |
| 3,240,249 | 3/1966 | Lugli............................152/361 |
| 3,242,965 | 3/1966 | Mirtain........................152/361 |

FOREIGN PATENTS OR APPLICATIONS

| | | | |
|---|---|---|---|
| 700,790 | 12/1964 | Canada | 152/354 |
| 1,275,020 | 9/1961 | France | 152/361 |

*Primary Examiner*—Arthur L. La Point
*Assistant Examiner*—Richard A. Bertsch
*Attorney*—Cushman, Darby & Cushman

[57] ABSTRACT

A tire having an embedded breaker belt, the belt being composed of one or more intermediate plies, which are relatively rigid in the lengthwise direction, sandwiched between plies which are relatively deformable in the lengthwise direction. The intermediate plies may be rayon, and the sandwiching plies may be nylon.

5 Claims, 2 Drawing Figures

PATENTED JAN 25 1972 3,637,003

INVENTOR
BRIAN F. CLAPSON

BY Cushman, Darby & Cushman
ATTORNEYS

COMPOSITE BREAKER BELT FOR RADIAL PLY TIRE

This invention is concerned with tires and, in particular with the kind of tire now generally known as "radial ply."

A radial ply tire derives its distinctive properties essentially from the provision, beneath the tread portion of the tire and above the carcass fabric, of a structural member known as a breaker belt. Such a belt has the form of a continuous band composed of superposed layers of parallel cords which extend almost circumferentially (say at an angle of about 10° to the circumferential direction, with cords of adjacent layers crossing).

The cords used as reinforcements are commonly made of textile fibers and the use of such fibers as rayon and nylon in this context is already well known.

In use the breaker belt is subjected to a number of modes of deformation, of which the main ones can conveniently be referred to as longitudinal deformation, transverse deformation, in-plane deformation, and extension.

Longitudinal deformation occurs when a tire runs over a ridge extending across its path of movement and the line of most severe bending is then parallel to the rotary axis of the tire.

The higher or lower the rigidity of the breaker belt against this form of deformation the "harder" or "softer," respectively, the "ride" in terms of comfort to vehicle passengers.

Thus, nylon, by reason of a higher extensibility and lower modulus of extension than rayon, gives a softer ride than rayon when used in breaker belts, while at the same time providing the advantages accruing from its greater strength.

Transverse deformation of a breaker belt occurs (in addition to longitudinal deformation) when the tire runs over a sharp object such as a stone. The cross-sectional form of the breaker belt, when the section is taken in an axial plane, then assumes a U-shape. This kind of deformation is very relevant to comfort.

In-plane deformation is of considerable importance. It manifests itself mainly as a stretching or compressing of the breaker belt fibers along their length. This kind of deformation occurs on cornering and can be very severe when cornering takes place at high speeds. Such deformation arises because, in order to achieve cornering, the wheel must be kept facing in a direction which is inclined to the direction in which the vehicle is actually travelling. The consequence is that, while the part of the tread of the tire making contact with and gripping on the ground surface tends to be directed substantially as it would be if no change of direction were being attempted, the main portion of the tire is directed as though a change of direction had already occurred.

It is desirable for a number of well-known reasons that the in-plne deformation be as small as possible.

Extension is simply an increase in breaker belt radius such as occurs when the tire is under inflation and the breaker belt is placed under tension. The smaller the extension the longer is the tread life of the tire, since the rubber adjacent to the tread is subjected to lesser tension.

The present invention provides a tire having a breaker belt, wherein the breaker belt is composed of several plies, the innermost ply or plies consisting predominantly of fibers relatively rigid in the lengthwise direction and the outermost plies consisting predominantly of fibers relatively deformable in the lengthwise direction. That is, the intermediate ply or plies are relatively rigid in the lengthwise direction and lie between other plies which are relatively deformable in the lengthwise direction.

A suitable number of plies for the breaker belt is from three to six and conveniently each ply may consist of nylon cords or of rayon cords. The ratio of the number of nylon plies to the number of rayon plies in this case is suitably in the range of from 1:1 to 2:1.

The following experimental results illustrate, by way of example, the advantageous characteristics of tires constructed in accordance with the present invention as compared with tires whose breaker belts consist wholly of nylon cords or wholly of rayon cords.

Three breaker belts of the composition given in the following table were made. The rubber matrix in which the belt plies were embedded was a standard tire rubber. The belts were subjected to stretching while maintained in substantially circular form and a stretching force of 150 pounds weight per inch of belt width was initially applied. The stretching force was then increased to 250 pounds weight per inch of belt width and the percent extension measured in the three cases. The values observed for the extension are given in the following table. The nylon and rayon cords used were of standard commercial quality.

| | Belt | | |
|---|---|---|---|
| | A | B | C |
| Ply: | | | |
| 1 | 11 e.p.i., 2/4/840 nylon. | 11 e.p.i., 2/4/840 nylon. | 22 e.p.i., 3/1650 rayon. |
| 2 | do | 22 e.p.i., 3/1650 rayon. | Do. |
| 3 | do | 11 e.p.i., 2/4/840 nylon. | Do. |
| Angle of cords, deg. | 10 | 10 | 10. |
| Extension, percent. | 3.5 | 3.0 | 2.6. |

NOTE.—E.p.i. means ends per inch.

As shown in the table the extension of breaker belt B is intermediate between those of breaker belts A and C, composed respectively of all nylon or all rayon cords. When embodied in radial ply tires of similar and otherwise standard construction the advantageous extension properties of breaker belt B were manifested in better tire performance, the tires containing breaker belt B being preferable to the tires containing breaker belt A. At the same time the tires containing breaker belt B gave as soft a ride as the tires containing breaker belt A. The tire containing breaker belt C gave the least comfortable ride.

Figure 2:
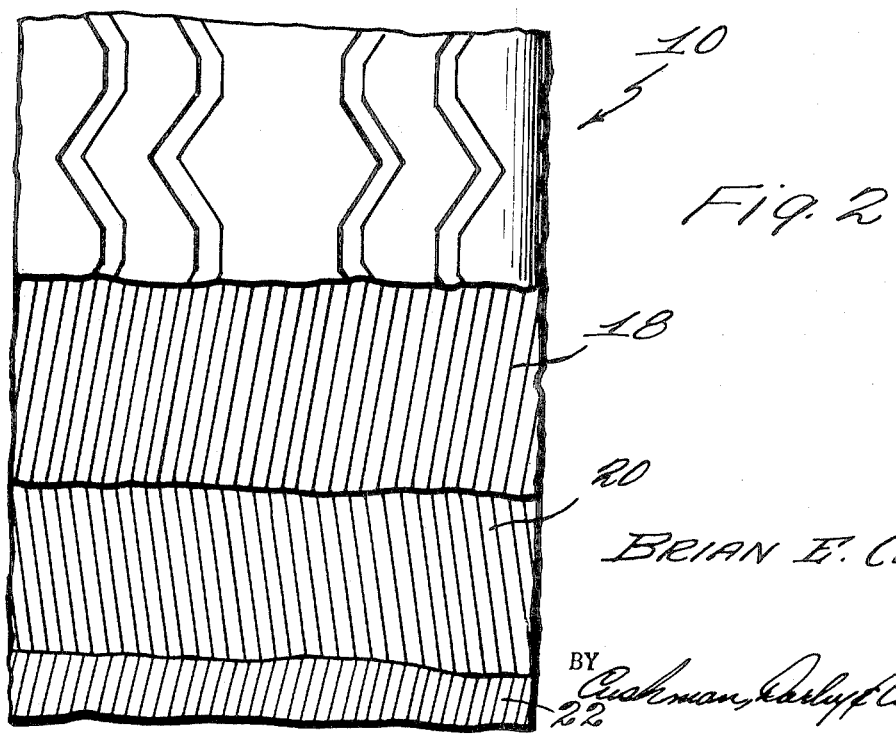

FIG. 1 is a fragmentary transverse sectional view of a radial ply tire embodying the principles of the present invention, and FIG. 2 is a fragmentary top plan view, partly broken away, of the tire of FIG. 1.

As shown in the drawing, the tire 10 includes an inner carcass 12, an outer side layer 14 of rubber and a rubber tread portion 16. Embedded in the tire beneath the tread portion 16 and above the carcass 12 is a circumferentially continuous breaker belt constructed in the form of three plies 18, 20 and 22, each constructed of parallel cords as described above with reference to breaker belt B. That is, the uppermost and lowermost plies 18 and 22 are formed of nylon cords, and the intermediate ply 20 formed of rayon cords.

It will be clear to those skilled in the art that in the structures envisaged by the present invention other fibers than nylon which combine advantageous properties, such as high strength, with suitable lengthwise deformability can be used. In the same way other fibers than rayon, which combine suitable strength with lengthwise rigidity can be used.

What we claim is:

1. A tire having a breaker belt embedded therein beneath the tread portion and above the carcass fabric and being approximately as wide as said tread portion, said breaker belt having at least one intermediate ply lying between other plies, said intermediate ply consisting predominantly of fibers which are relatively rigid in the lengthwise direction, and said other plies consisting predominantly of fibers which are relatively deformable in the lengthwise direction.

2. A tire as claimed in claim 1 wherein the relatively rigid fibers are made of rayon.

3. A tire as claimed in claim 1 wherein the relatively deformable fibers are made of nylon 66.

4. A tire as claimed in claim 1 wherein the relatively rigid fibers are made of rayon and the relatively deformable fibers are made of nylon 66.

5. A tire as in claim 1 wherein the ratio of the numbers of relatively deformable and relatively rigid plies is from 1:1 to 2:1.

* * * * *